T. F. WARDWELL.
Transporting Plants.
No. 47,234.
Patented Apr. 11, 1865.
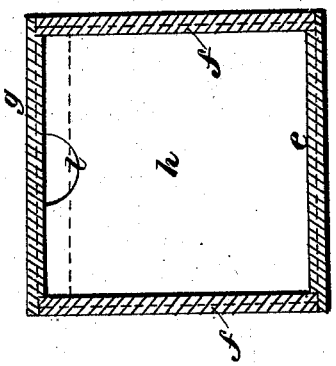
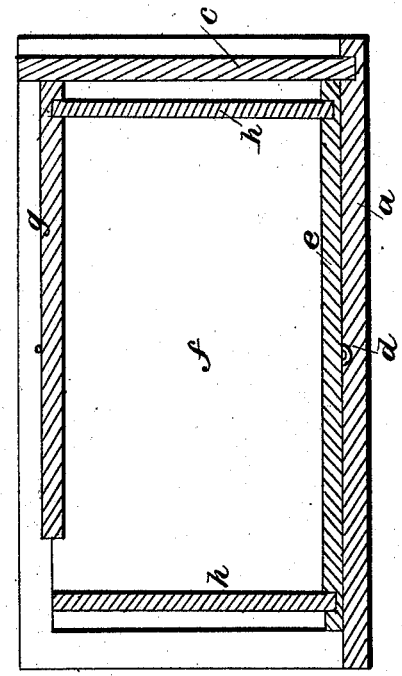
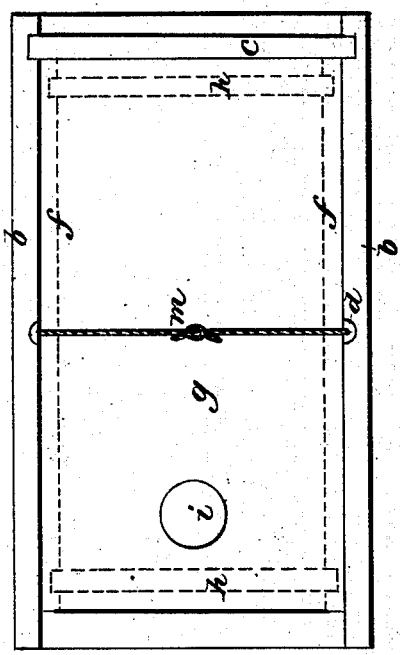
Witnesses
John L. Lewis
Henry P. Sartwell
Inventor.
T. F. Wardwell

United States Patent Office.

TIMOTHY F. WARDWELL, OF PENN YAN, NEW YORK.

IMPROVEMENT IN BOXES FOR TRANSPORTING PLANTS.

Specification forming part of Letters Patent No. 47,234, dated April 11, 1865.

*To all whom it may concern:*

Be it known that I, TIMOTHY F. WARDWELL, of Penn Yan, in the county of Yates and State of New York, have invented, made, and applied to use a certain new and useful Improvement in Boxes for the Transportation of Plants, &c.; and I do hereby declare the following to be a full, clear, and exact description of my said invention, reference being had to the annexed drawings, making part of this specification, wherein—

Figure 1 is a plan of my box complete, and contained in the mold in which it is put together. Fig. 2 is a longitudinal section of said box and mold, and Fig. 3 is a cross-section of my improved box.

Similar marks of reference denote the same parts.

It is desirable that boxes for plants should be made in such a manner that the pieces of which they are composed may be packed together in a small compass previous to use, and that the boxes, when put together for use, are strong and light, and that the plants can be introduced with facility, the boxes closed with dispatch, and the plants afterward removed without injury. To effect these objects I form a box of flat pieces grooved in such a manner that the parts will set correctly together and form a strong and light box; and I employ a mold in which to put the box together, introduce the plant, and envelop and tie the box.

The separate pieces of which my box is composed can be set compactly together, so as to occupy but little space previous to being put together for the reception of the plant, and said pieces are not injured by being put together, as they would be if nails were inserted into the thin wood of which my box is composed.

In the drawings, $a$ is the bottom, $b\ b$ the sides, and $c$ the end, of an open box or mold into which the parts of the box are to be introduced, and which mold insures the pieces coming properly together and sustains them while the plant is being introduced and the box wrapped in paper and tied up. To effect this I provide a groove at $d$, into which to lay a string, and the paper used for wrapping the box should be laid into the mold before the parts of the box are introduced.

$e$ is the bottom, $f\ f$ the side pieces, $g$ the top, and $h\ h$ the end pieces, forming my box. The side pieces are grooved across near their ends to receive the end pieces, $h\ h$, as are also the top and bottom pieces, $e$ and $g$. These latter are also rabbeted on their edges, (see Fig. 3,) so as to receive the edges of the side pieces, $f f$.

It is necessary that an opening be left in the box for the admission of air and for inspecting the contents, particularly where such boxes are sent by mail. To effect this I form a hole at one end of the top $g$, as at $i$, or I form the top piece shorter, as seen at $k$, Fig. 2, so as to leave an opening, or one of the end pieces, $h$, may have a notch cut in it, as at $l$, Fig. 3, or be made narrower, as represented by dotted lines, Fig. 3, so that in either mode there will be an opening formed sufficient for the inspection of the contents of the box.

$m$ represents a string tied around the box, which holds it firmly together after the plant or other article has been introduced.

What I claim, and desire to secure by Letters Patent, is—

A box for plants, &c., formed by the flat pieces of wood grooved and set together in the manner specified, and provided with an opening, for the purposes and as set forth.

In witness whereof I have hereunto set my signature this 21st day of November, 1864.

T. F. WARDWELL.

Witnesses:
HENRY P. SARTWELL,
JOHN L. LEWIS.